United States Patent [19]

Wingbro

[11] Patent Number: 6,070,653
[45] Date of Patent: Jun. 6, 2000

[54] CYLINDRICAL VESSEL FOR SEPARATION

[75] Inventor: Torgny Wingbro, Lidingö, Sweden

[73] Assignee: AGA Aktiebolag, Lindingo, Sweden

[21] Appl. No.: 09/142,296

[22] PCT Filed: Feb. 26, 1997

[86] PCT No.: PCT/SE97/00331

§ 371 Date: Feb. 19, 1999

§ 102(e) Date: Feb. 19, 1999

[87] PCT Pub. No.: WO97/32657

PCT Pub. Date: Sep. 12, 1997

[30] Foreign Application Priority Data

Mar. 4, 1996 [SE] Sweden .................................. 9600843

[51] Int. Cl.⁷ .................................................. F28D 13/00
[52] U.S. Cl. ...................... 165/104.16; 165/119; 55/518; 95/900; 96/143
[58] Field of Search .............................. 165/104.16, 119, 165/162, 163; 62/476, 477, 480; 55/475, 518; 95/900; 96/143

[56] References Cited

U.S. PATENT DOCUMENTS

| | | | |
|---|---|---|---|
| 712,089 | 10/1902 | Piatt | 165/119 |
| 723,068 | 3/1903 | White | 165/119 |
| 1,109,103 | 9/1914 | Baum | 165/119 |
| 3,063,259 | 11/1962 | Hankison et al. | 165/119 |
| 4,422,932 | 12/1983 | Kalberer | 165/119 X |
| 4,888,156 | 12/1989 | Johnson | 165/104.16 X |

FOREIGN PATENT DOCUMENTS

| | | | |
|---|---|---|---|
| 480797 | 4/1992 | European Pat. Off. | |
| 612553 | 12/1994 | European Pat. Off. | |
| 667911 | 10/1929 | France | 165/119 |
| 0180888 | 8/1986 | Japan | 165/104.16 |
| 438266 | 4/1985 | Sweden | |
| 566114 | 8/1977 | U.S.S.R. | 165/119 |
| 568061 | 3/1945 | United Kingdom | 165/119 |

*Primary Examiner*—Christopher Atkinson
*Attorney, Agent, or Firm*—Pearne, Gordon, McCoy & Granger LLP

[57] ABSTRACT

A separation device comprises a vessel (1) having an essentially circular cylindrical shape around a center axis (2), a first passage (4) provided in the cylindrical wall of the vessel and a second passage (5), provided in the cylindrical wall of the vessel on a diametrically opposite part thereof. An enclosure means (6) is provided in the vessel (1) to enclose a bed (7) of particulate material and comprises a first and second enclosure panel (8, 9) provided inside the first and second passages (4, 5), respectively, at a distance therefrom to provide a flow distribution space (11) therebetween and being perforated (15) to permit fluid flow therethrough. Each of said enclosure panels (8, 9) has an outer surface which is essentially parallel with the center axis (2) and convex seen from the respective passage (4,5).

11 Claims, 2 Drawing Sheets

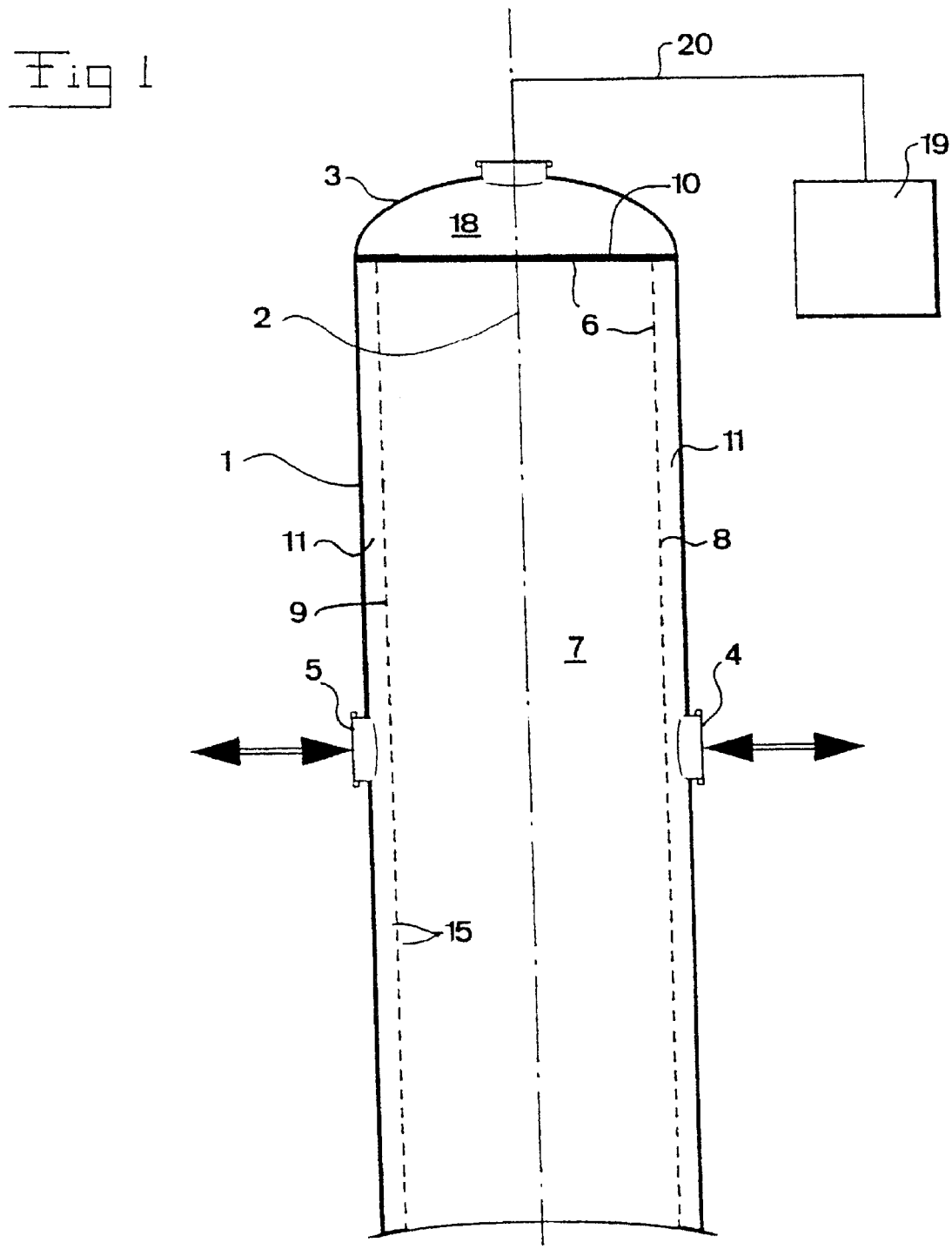

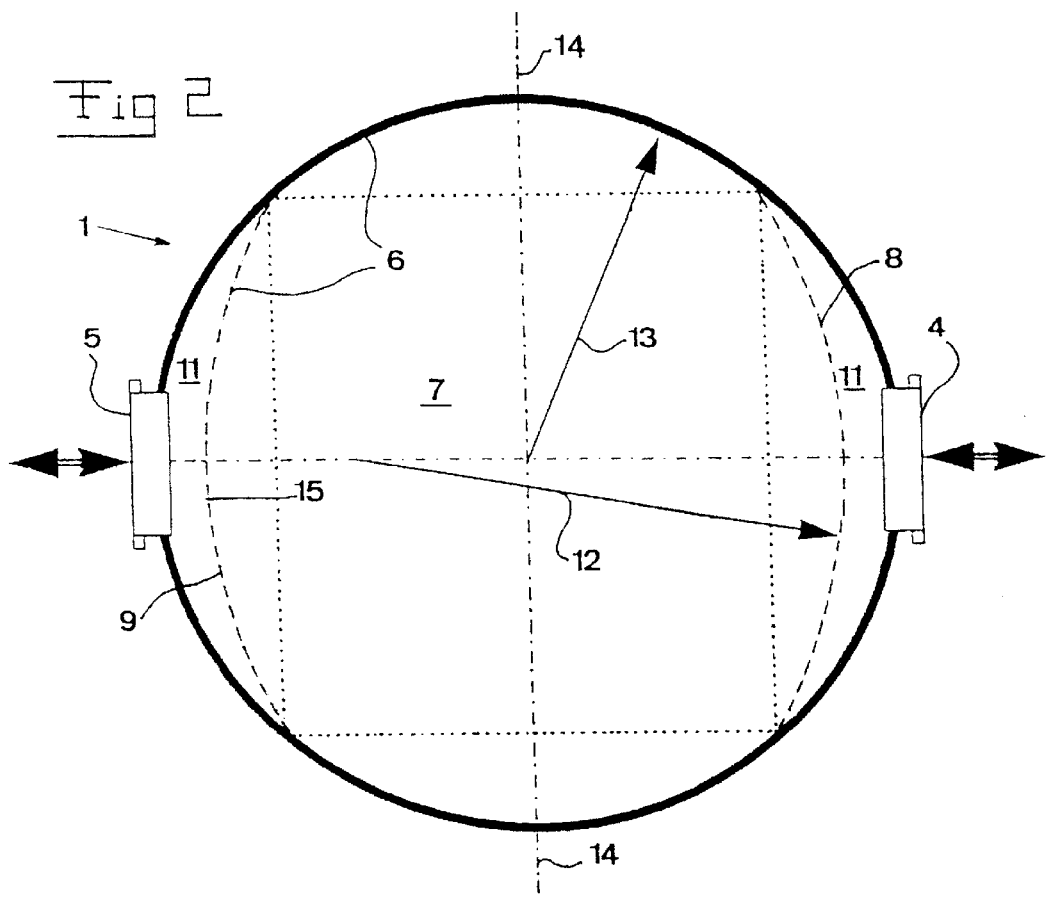
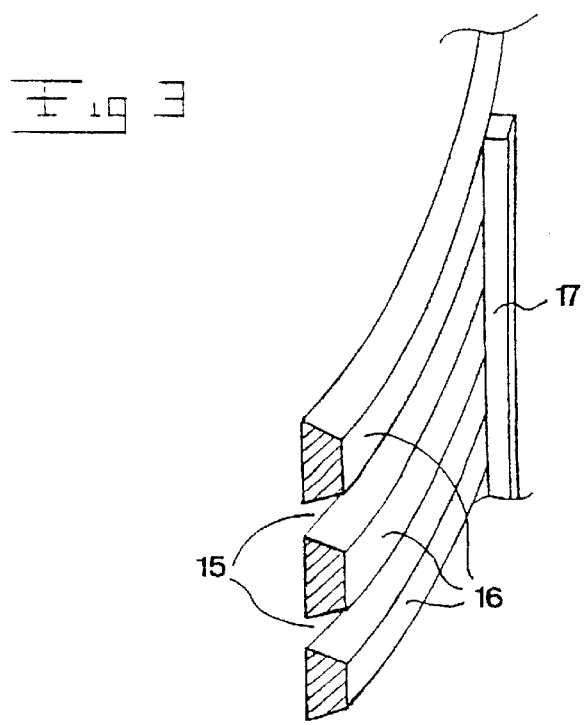

CYLINDRICAL VESSEL FOR SEPARATION

BACKGROUND OF THE INVENTION

The present invention relates to a separation device comprising a vessel having an essentially circular cylindrical shape around a center axis, a first passage provided in the cylindrical wall of the vessel, a second passage, provided in the cylindrical wall of the vessel on a diametrically opposite part thereof, and an enclosure means provided in the vessel to enclose a bed of particulate material and comprising a first and second enclosure panel provided inside the first and second passage, respectively, at a distance therefrom to provide a flow distribution space therebetween and being perforated to permit fluid flow therethrough.

It is known to produce gases, such as oxygen and nitrogen, by the separation of air, Furthermore, it is known to provide such a separation by means of a so called PSA-process (Pressure Swing Adsorption). A conventional PSA-process uses one or more adsorption beds containing an adsorbent provided in one or more layers. Typically, the adsorbent comprises molecular sieves particles having a size of 1–2 mm. During the PSA-process the gas is flowing through the adsorption bed, whereby the flow rate and the direction of the gas is changing during the different phases of the process. In order to increase the process efficiency, it is necessary with a bed which allows high gas flow rates in all directions of flow. However, in a conventionally constructed adsorption bed the flow rate of the gas is limited in one of the two directions by the risk of fluidization of the bed material. Fluidization leads to immediate destruction of the bed material. Thus, the risk for fluidization is a limiting factor when developing new more efficient processes.

In a conventional adsorption bed, it is relied on the gravitation to avoid fluidization of the bed material and thus the gas flow is vertically directed. Due to the gravitation the flow rate in a downward direction may be higher than in an upward direction. Normally, during the adsorption phase the gas flow is directed upwardly and during the regeneration phase the gas flow is directed downwardly.

A vessel for a conventional adsorption bed normally has the shape of a circular cylinder, thereby providing sufficient structural strength to the vessel. The vessel is provided with its center axis vertically directed and the gas is flowing through the vessel along the center axis. The absorption bed is constructed such that it has an essentially constant cross-section area in order to provide optimal conditions during the adsorption phase, i.e. the gas flow will be distributed equally in all parts of the adsorption bed and thus the adsorption conditions will be equal. This is easily achieved by means of an upper and lower plane panel limiting the adsorption bed and being perforated to permit gas flow therethorugh. However, the possible length of the bed seen in the flow direction is limited due to the pressure drop in the bed. For larger separation systems, the bed therefore has to be arranged in an horizontal cylinder vessel. Thereby, the adsorption bed is defined by an upper and lower plane panel, being perforated and extending in parallel with the horizontally directed center axis, and parts of the cylindrical wall of the vessel between these panels. The upper panel is floating on top of the bed material and gives only a small contribution to prevent fluidization. The gas will flow through an inlet in the cylindrical wall of the vessel to a flow distribution space between the cylindrical wall and one of said panels, through the bed and to another flow distribution space between the cylindrical wall and the other of said panels, and through an outlet in the cylindrical wall of the vessel. However, the gas flow through the bed of such a horizontal cylindribal vessel will not be distributed equally, because of the cylindrical walls of the vessel. This means that the gas flowing in the middle will pass the adsorption bed faster than the gas flowing closer to the cylindrical walls and consequently the adsorption front of the flow will not be plane. Such flow conditions are not optimal in respect of the process efficiency.

EP-A-480 797 discloses an adsorber for the separation of a gaseous mixture. The adsorber comprises an enclosure containing a mass of adsorbing particulate material. The enclosure has an elongated shape and comprises two longitudinal perforated plane shaped panels being separated from and parallel to each other. The panels and parts of the enclosure wall defines a chamber containing the particulate material. The enclosure is provided in a vertical orientation and thus the gas flow therethrough is horizontal. On top of the particulate material, there is provided a flexible wall outside which is formed a closed space to be pressurized in order to maintain the particulate material in a fixed position within the bed. The particulate material is provided in two successive layers, seen in the direction of the gas flow, with different particle sizes in the two layers.

SUMMARY OF THE INVENTION

The object of the present invention is to improve the efficiency of a separation device of the initially defined type. In particular the object is to provide such a separation device permitting a high flow rate of the gas. Moreover, the separation device should effectively prevent fluidization of the particulate bed material and at the same time provide an improved flow distribution in a bed with varying cross section.

This object is obtained by means of the separation device initially defined, which is characterized in that each of said enclosure panels has an outer surface which is essentially parallel with the center axis and convex seen from the respective passage. Such a convex enclosure panel demonstrates a high strength and stability in comparison with a plane panel. Thus, the inventive enclosure panel may be constructed in a simple and cost efficient manner, since no support structure is needed for such a curved panel. A plane panel requires a very rigid support structure in order to avoid bending and/or vibration due to the pressure from the flowing process gas. With such a convex, curved panel the forces acting on the panel will be transformed to essentially membrane stresses in the panel. Furthermore, by means of a convex enclosure panel it is possible to compensate for the fact that the gas flowing in the middle of the bed will pass faster therethrough than the gas flowing closer to the cylindrical walls of the vessel. This means that gas flow will demonstrate an essentially plane front configuration, and therefore all parts of the bed will be uniformly utilized during the adsorption process. Moreover, by means of convex enclosure panels, it is possible to increase the amount of particulate material in the bed, since the empty space in the cylindrical vessel is reduced in comparison with the plane enclosure panels previously known. Thereby, the efficiency of the process may be further improved.

According to an embodiment of the invention each of said convex panels has an essentially circular cylindrical shape with a radius of curvature being greater than the radius of curvature of the cylindrical wall. An essentially cylindrical shape is particularly advantageous in respect of strength and flow configuration.

According to a further embodiment of the invention, the enclosure means comprises two enclosure walls each formed by a part of the cylindrical wall of the vessel and extending between said first and second enclosure panels.

According to a further embodiment of the invention, the enclosure means comprises a flexible end wall provided to be forced against the particulate material in order to maintain said material in a substantially motionless position. Thereby, the cylindrical vessel may comprise an end wall, the flexible end wall being provided inside the end wall of the vessel at a distance therefrom to provide a closed space therebetween. By pressure regulating means provided the pressure in said closed space may be regulated such that the particulate material within the enclosure means is maintained in said substantially motionless position. Hence, it is possible to increase the gas flow rate through the bed and still keep the particulate material in a fixed position therein. Since the flexible end wall can move, it will automatically follow as the particulate material becomes more compact and is sinking in the bed, which normally occurs during the initial period of operation of the process.

According to a further embodiment of the invention, the first and second enclosure panels comprises perforations shaped as elongated slits extending essentially perpendicular to the center axis. Each of the enclosure panels may comprise perforations formed by a plurality of curved metal bars provided in parallel to each other and with a gap between each of the bars. Thereby, the metal bars may be maintained in said parallel orientation by means of elongated support means extending parallel to the center axis. Due to the convex shape of the enclosure panels, such elongated support means may be formed by metal beams of small dimensions, thereby reducing the cost for the panels.

According to a further embodiment of the invention, the center axis is directed in a substantially vertical orientation. For such a vertical vessel in which the gas flow is horizontally directed the limiting dimension is the diameter of the cylindrical vessel. The height of the vessel is merely limited by the handling aspects. Thus, such a vessel may have a considerable size.

According to a further embodiment of the invention, the vessel and the enclosure means are essentially symmetrical with respect to a midplane containing the center axis. Thereby, the first and second passages are diametrically opposed to each other.

According to a further embodiment of the invention, the particulate material comprises an adsorbing material, such as molecular sieves. Thereby, the separation device may be used to separate air into nitrogen and oxygen.

BRIEF DESCRIPTION OF THE DRAWINGS

The present invention will now be explained in more detail in connection with the description of an embodiment thereof and with reference to the accompanying drawings, in which FIG. 1 is a vertical cross-section view of an adsorption vessel according to the present invention, FIG. 2 is a horizontal cross-section view of the vessel in FIG. 1, and FIG. 3 is a vertical cross-section view of a part of an enclosure panel provided in the vessel.

DETAILED DESCRIPTION OF THE PREFERRED EMBODIMENTS

With reference to FIG. 1 and 2, there is disclosed an elongated vessel 1 having an essentially circular cylindrical wall around a vertical center axis 2, an upper end wall 3 and a lower end wall (not shown), which is essentially spherically curved and forms the base of the vessel 1. In the cylindrical wall of the vessel 1, there are provided a first passage 4 and a second passage 5 diametrically opposite to the first passage 4. An enclosure means 6 is provided in the vessel 1 to enclose an adsorbent 7 in the form of a bed of particulate material, such as molecular sieves, comprising particles having a size of about 1–2 mm. Such molecular sieves may be formed by zeolites. The enclosure means 6 is defined by a first and second enclosure panel 8 and 9, respectively, by the parts of the cylindrical wall of the vessel 1, which extend between said first and second enclosure panels 8, 9, by an upper end wall 10, and a lower end wall (not shown), which may be formed by said end wall of the vessel 1. The first and second enclosure panels 8, 9 are provided inside the first and second passage 4, 5, respectively, at a distance therefrom to provide a flow distribution space 11 therebetween and have an inner and outer surface extending parallel to the center axis 2 along almost the total length of the vessel 1. The first and second enclosure panels 8, 9 are both perforated to permit fluid flow therethrough. Each enclosure panel 8, 9 is curved in one direction to a convex shape seen from the respective passage 4, 5. The curvature of each panel 8, 9 is such that it has an essentially circular cylindrical shape with a radius 12 of curvature being greater than the radius 13 of curvature of the cylindrical wall of the vessel 1. In the embodiment disclosed each enclosure panel 8, 9 has such a length that the distance between its lines of contact with the cylindrical wall corresponds to one side of a square inscribed in the cylindrical vessel 1, see FIG. 2. It should be noted that instead of the square shape a rectangle having two different side lengths may inscribed in the cylindrical vessel 1. The relation between the radius 12 of the enclosure wall and the radius 13 of the cylindrical vessel wall should be greater than 1 and less than 7, preferably between 2 and 6, and more specifically between 3 and 6. This relation may lie outside these ranges if the square inscribed instead has the shape of a rectangle.

As may be seen from FIG. 2, the vessel 1 is symmetrically shaped with regard to a midplane 14. This means that both the first passage 4 and the second passage 5 may operate as an inlet passage and an outlet passage, respectively, during an adsorbing phase as well as during a regeneration phase.

The perforations 15 of the enclosure panels 8, 9 are shaped as elongated slits being essentially perpendicular to the center axis 2 and extending along the total width of each enclosure panel 8, 9. The perforations may be formed by means of elongated metal bars 16 provided in parallel with each other and with a gap 15 between each bar 16, see FIG. 3. The metal bars 16 are curved with a radius corresponding to the radius 12 of curvature. In cross-section each bar 16 is converging from the surface facing the particulate material 7 to the surface facing the flow distribution space 11. Thus, the smallest distance between each bar 16 is adjacent the inner surface facing the adsorbent 7. It is clear that this distance must be smaller than the size of the particles of the adsorbent 7. The bars 16 are supported and kept in proper position by means of elongated support means 17, in the form of a small beam, preferably welded to the bars 16.

Between the upper end wall 3 of the vessel 1 and the upper end wall 10 of the enclosure means 6, there is a provided a closed space 18. The upper end wall 10 of the enclosure means 6 comprises a flexible membrane. The closed space 18 is connected to a pressure regulating means 19, schematically disclosed, via conduit means 20. Thus, by means of the pressure regulating means 19, the pressure in the closed space 18 may be regulated such that the particulate material within the enclosure means 6 is maintained in a substantially motionless, fixed position. This means that as long as the pressure in the closed space 18 is higher than the pressure within the enclosure means 6, i.e. the bed 7, the flow rate of the gas may be increased in comparison with the prior art, since the particles of the bed 7 are hindered to move and start to fluidize due to said pressure difference.

Moreover, since the particulate material 7 is immovable and since the vessel 1 is symmetrically shaped with regard to the midplane 14, high flow rates may be permitted in both the flow directions.

The separation device disclosed may function as described in the following example of oxygen production by adsorption of nitrogen from air. The air is introduced through the passage 4 and is distributed in the flow distribution space 11. From there the air is entering the bed 7 of adsorbent through the perforations in the convex enclosure panel 8. The air flows through the bed 7 such that the front of the gas flow is essentially plane when the flow passes the midplane 14. This means that the air is uniformly distributed to all parts of the bed 7 and all of the particles will be equally active in the adsorbing nitrogen. The gas flow, from which a substantial part of the nitrogen has been removed, is the leaving the vessel 1 via the other enclosure panel 9, the flow distribution space 11 and the passage 5. When the bed of particulate material 7 may not adsorb more nitrogen, the process is reversed and the direction of the gas flow is changed, e.g. by means of a vacuum pump (not shown) connected to the passage 4. Due to the pressure decrease the nitrogen adsorbed will leave the bed 7 via the enclosure panel 8, the flow distribution space 11 and the passage 4. Although this example refers to the separation of air into oxygen and nitrogen, it should be clear to the person skilled in the art that the separation device according to the present invention also may be used for the separation of other gases.

The present invention is not limited to the embodiment disclosed above but may be varied or modified within the scope of the following claims.

The separation device may also be used for removing humidity from air or other gases.

The term "separation" should, as used throughout the present application. be interpreted in a broad sense; e.g. the device according to the present invention may be used as a heat exchanger to separate heat from a fluid, i.e. a gas, a liquid or a mixture thereof.

What is claimed is:

1. A separation device comprising a vessel (1) having an essentially circular cylindrical wall disposed around a center axis (2), a first passage (4) provided in the cylindrical wall, a second passage (5) provided in the cylindrical wall of the vessel (1) on a diametrically opposite part thereof relative to said first passage, and enclosure means (6) for enclosing a bed (7) of particulate material, said enclosure means comprising first and second enclosure panels (8, 9) spaced inwardly from the first and second passages (4, 5), respectively to provide a flow distribution space (11) therebetween and being perforated (15) to permit fluid flow therethrough, and two enclosure walls each formed by a part of the cylindrical wall of the vessel (1) and extending between said first and second enclosure panels (8, 9). wherein each of the first and second enclosure panels has an outer surface which is essentially parallel with the center axis (2) and convex as seen from the respective passage (4, 5).

2. A separation device according to claim 1, wherein each enclosure panel (8, 9) has an essentially circular cylindrical shape with a radius (12) of curvature being greater than a radius (13) of curvature of the cylindrical wall of the vessel (1).

3. A separation device according to claim 1, wherein the enclosure means (6) comprises a flexible end wall (10) provided to be forced against the bed (7) of particulate material in order to maintain said material in a substantially motionless position.

4. A separation device according to claim 3, wherein the cylindrical vessel (1) comprises an end wall (3), the flexible end wall (10) is disposed inside the vessel end wall (3) at a distance therefrom to provide a closed space (18) therebetween and pressure regulating means (19, 20) is provided to regulate the pressure in said closed space (18) such that the bed (7) of particulate material within the enclosure means (6) is maintained in said substantially motionless position.

5. A separation device according to claim 1, wherein the first and second enclosure panels (8, 9) comprises perforations (15) shaped as elongated slits extending essentially perpendicular to the center axis (2).

6. A separation device according to claim 1, wherein each of the enclosure panels (8, 9) comprises perforations (15) formed by a plurality of curved metal bars (16) provided in parallel to each other and with a gap between each of the bars (16).

7. A separation device according to claim 6, wherein the metal bars (16) are maintained in said parallel orientation by means of elongated support means (17) extending parallel to the center axis (2).

8. A separation device according to claim 1, wherein the center axis (2) is directed in a substantially vertical orientation.

9. A separation device according to claim 1, wherein the vessel (1) and the enclosure means (6) are essentially symmetrical with respect to a midplane (14) containing the center axis (2).

10. A separation device according to claim 1, wherein the particulate material comprises an adsorbing material.

11. A separation device according to claim 10, wherein the adsorbing material is molecular sieves.

* * * * *